US012757078B2

(12) United States Patent
Wänstedt et al.

(10) Patent No.: US 12,757,078 B2
(45) Date of Patent: Oct. 6, 2026

(54) BASE STATION, A CORE NETWORK NODE AND METHODS IN A SCENARIO WHERE A FIRST BASE STATION IS REPLACED BY A SECOND BASE STATION

(71) Applicant: Telefonaktiebolaget LM Ericsson (publ), Stockholm (SE)

(72) Inventors: Stefan Wänstedt, Luleå (SE); Peter Ökvist, Luleå (SE); Tommy Arngren, Södra Sunderbyn (SE); Hans Hannu, Luleå (SE); Jan Christoffersson, Luleå (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 218 days.

(21) Appl. No.: 18/567,768

(22) PCT Filed: Jun. 7, 2021

(86) PCT No.: PCT/SE2021/050544
§ 371 (c)(1),
(2) Date: Dec. 6, 2023

(87) PCT Pub. No.: WO2022/260561
PCT Pub. Date: Dec. 15, 2022

(65) Prior Publication Data

US 2024/0276309 A1 Aug. 15, 2024

(51) Int. Cl.
*H04W 36/00* (2009.01)
*H04W 52/02* (2009.01)

(52) U.S. Cl.
CPC ... *H04W 36/0009* (2018.08); *H04W 52/0206* (2013.01)

(58) Field of Classification Search
CPC ......... H04W 36/0009; H04W 52/0206; H04W 84/005; H04W 24/04; H04W 84/06; H04W 88/08; H04B 7/18504
See application file for complete search history.

(56) References Cited

U.S. PATENT DOCUMENTS

| | | | |
|---|---|---|---|
| 9,001,767 B1 | 4/2015 | Gatewood et al. | |
| 10,034,209 B1 * | 7/2018 | Nandan | H04W 36/0061 |

(Continued)

FOREIGN PATENT DOCUMENTS

| | | |
|---|---|---|
| EP | 2978258 A1 | 1/2016 |
| EP | 3800928 A1 | 4/2021 |

(Continued)

OTHER PUBLICATIONS

International Search Report and Written Opinion, Application No. PCT/SE2021/050544, Feb. 15, 2022, 15 pages.

(Continued)

*Primary Examiner* — Christopher T Wyllie
(74) *Attorney, Agent, or Firm* — Nicholson De Vos Webster & Elliott LLP

(57) ABSTRACT

A first radio base station (BS), a second BS and a core network (CN) node are provided, as are methods of operating the BSs and CN node when a first base station is to be replaced by a second BS. The first BS transfers to the second BS, information indicative of a BS state associated with the operation of the first BS; stops transmission to/from all wireless devices (WDs) to which the first BS is currently providing radio access; and transfers, to the second BS, information indicative of a plurality of WD states, a WD state being associated with a WD. The second BS then provides radio access to WDs, to which the first BS has hitherto provided radio access. The CN node can identify a (Continued)

need to replace a first BS; send a swap-in request to the first BS; and send a swap-out request to the second BS.

18 Claims, 7 Drawing Sheets

(56) References Cited

U.S. PATENT DOCUMENTS

| | | | | |
|---|---|---|---|---|
| 2003/0021254 | A1* | 1/2003 | Fukuda | H04W 8/26 370/328 |
| 2012/0077533 | A1 | 3/2012 | Irmer et al. | |
| 2013/0064157 | A1* | 3/2013 | Lindgren | H04W 52/0216 370/311 |
| 2013/0223403 | A1* | 8/2013 | Chen | H04W 36/24 370/331 |
| 2016/0035224 | A1* | 2/2016 | Yang | G08G 5/723 701/23 |
| 2016/0381699 | A1* | 12/2016 | Rubin | H04B 17/00 370/329 |
| 2017/0041806 | A1* | 2/2017 | Randall | H04W 16/22 |
| 2017/0154536 | A1* | 6/2017 | Kreiner | G06Q 10/00 |
| 2017/0208512 | A1* | 7/2017 | Aydin | H04W 72/23 |
| 2018/0132246 | A1* | 5/2018 | Ke | H04W 76/27 |
| 2018/0248640 | A1* | 8/2018 | Wei | H04J 11/0073 |
| 2018/0346140 | A1* | 12/2018 | Clemente | B64U 50/34 |
| 2019/0248488 | A1* | 8/2019 | Yakimenko | G06V 20/52 |
| 2019/0306757 | A1* | 10/2019 | Husain | G08G 5/55 |
| 2021/0091848 | A1 | 3/2021 | Cai | |
| 2021/0297921 | A1* | 9/2021 | Pragada | H04W 72/51 |
| 2021/0297959 | A1* | 9/2021 | Zhou | H04B 1/3838 |
| 2022/0094593 | A1* | 3/2022 | Karikallio | H04L 41/0806 |
| 2022/0338090 | A1* | 10/2022 | Wang | H04W 36/328 |
| 2023/0111064 | A1* | 4/2023 | Rahman | H04B 7/0628 370/252 |
| 2023/0254032 | A1* | 8/2023 | Harada | H04B 7/18513 342/352 |

FOREIGN PATENT DOCUMENTS

| | | | |
|---|---|---|---|
| GB | 2576203 | A | 2/2020 |
| WO | 2016/190793 | A1 | 12/2016 |
| WO | 2017/180211 | A1 | 10/2017 |
| WO | 2017/220110 | A1 | 12/2017 |
| WO | 2019/090361 | A1 | 5/2019 |
| WO | 2019/160460 | A1 | 8/2019 |
| WO | 2019/160461 | A1 | 8/2019 |
| WO | 2020/030244 | A1 | 2/2020 |

OTHER PUBLICATIONS

International Preliminary Report on Patentability, Application No. PCT/SE2021/050544, Apr. 19, 2023, 18 pages.

Rob Lefebvre, "AT&T's 'Flying Cow' drone provides cell service to Puerto Rico," Nov. 6, 2017, 7 pages, downloaded from https://www.engadget.com/2017-11-06-att-flying-cow-drone-cell-service-puerto-rico.html on Nov. 21, 2023.

3GPP TS 23.501 V16.8.0, "3rd Generation Partnership Project; Technical Specification Group Services and System Aspects; System architecture for the 5G System (5GS); Stage 2 (Release 16)," Mar. 2021, 451 pages, 3GPP Organizational Partners.

3GPP TS 33.310 V16.7.0, "3rd Generation Partnership Project; Technical Specification Group Services and System Aspects; Network Domain Security (NDS); Authentication Framework (AF) (Release 16)," Mar. 2021, 59 pages, 3GPP Organizational Partners.

3GPP TS 33.501 V17.1.0, "3rd Generation Partnership Project; Technical Specification Group Services and System Aspects; Security architecture and procedures for 5G system (Release 17)," Mar. 2021, 256 pages, 3GPP Organizational Partners.

3GPP TS 36.413 V16.5.0, "3rd Generation Partnership Project; Technical Specification Group Radio Access Network; Evolved Universal Terrestrial Radio Access Network (E-UTRAN); S1 Application Protocol (S1AP) (Release 16)," Apr. 2021, 424 pages, 3GPP Organizational Partners.

3GPP TS 36.420 V16.0.0, "3rd Generation Partnership Project; Technical Specification Group Radio Access Network; Evolved Universal Terrestrial Radio Access Network (E-UTRAN); X2 general aspects and principles (Release 16)," Jul. 2020, 14 pages, 3GPP Organizational Partners.

3GPP TS 38.321 V16.4.0, "3rd Generation Partnership Project; Technical Specification Group Radio Access Network; NR; Medium Access Control (MAC) protocol specification (Release 16)," Mar. 2021, 157 pages, 3GPP Organizational Partners.

3GPP TS 38.322 V16.2.0, "3rd Generation Partnership Project; Technical Specification Group Radio Access Network NR; Radio Link Control (RLC) protocol specification (Release 16)," Dec. 2020, 33 pages, 3GPP Organizational Partners.

3GPP TS 38.323 V16.3.0, "3rd Generation Partnership Project; Technical Specification Group Radio Access Network; NR; Packet Data Convergence Protocol (PDCP) specification (Release 16)," Mar. 2021, 40 pages, 3GPP Organizational Partners.

3GPP TS 38.413 V16.5.0, "3rd Generation Partnership Project; Technical Specification Group Radio Access Network; NG-RAN; NG Application Protocol (NGAP) (Release 16)," Apr. 2021, 473 pages, 3GPP Organizational Partners.

3GPP TS 38.420 V16.0.0, "3rd Generation Partnership Project; Technical Specification Group Radio Access Network; NG-RAN; Xn general aspects and principles (Release 16)," Jul. 2020, 16 pages, 3GPP Organizational Partners.

3GPP TS 38.455 V16.3.0, "3rd Generation Partnership Project; Technical Specification Group Radio Access Network; NG-RAN; NR Positioning Protocol A (NRPPa) (Release 16)," Apr. 2021, 151 pages, 3GPP Organizational Partners.

YouTube, "AT&T Cow (Cell On Wheels) tour—How AT&T is boosting network capacity at SXSW 2011," downloaded at https://www.youtube.com/watch?v=8BO1C3TT4xk on Nov. 28, 2023.

European search report and Search Opinion, EP App. No. 21945304.0, Jul. 15, 2024, 14 pages.

* cited by examiner

BASE STATION, A CORE NETWORK NODE AND METHODS IN A SCENARIO WHERE A FIRST BASE STATION IS REPLACED BY A SECOND BASE STATION

CROSS-REFERENCE TO RELATED APPLICATIONS

This application is a National stage of International Application No. PCT/SE2021/050544, filed Jun. 7, 2021, which is hereby incorporated by reference.

TECHNICAL FIELD

Embodiments presented herein relate to a method of operating a first radio base station (BS) which is to be replaced by a second BS, as well as to a method of operating a second BS which is to replace a first BS; a method of operating a core network node; corresponding computer programs and computer program products; a first BS; a second BS and a core network node.

BACKGROUND

Wireless communication networks have over the past decades contributed to unprecedented developments in the possibilities for communication between people and devices. The provisioning of a communication infrastructure to a geographical area can now be performed without much of the previously required cumbersome and resource demanding laying of cables. In recent years, providing first or additional communication facilities to a geographical area can be made with even less preparations by use of one or more moveable base stations (BSs), for example an airborne BSs mounted on an Unmanned Aerial Vehicle (UAV) or a BS mounted on other vehicles, such as trucks or boats.

As mentioned in WO2017/220110 A1, a need may arise to replace one airborne BS with another, for example due to a battery power drain. A method and apparatus for group handover or cell re-selection in non-terrestrial networks, wherein airborne BSs operate, is provided in GB2576203A. GB2576203 discloses a system wherein a plurality of User Equipments (UEs) are being served by a first airborne BS. A second replacement airborne BS broadcasts a transmission to the plurality of UEs at a second frequency, which is different to a first frequency used by the first BS. The first BS broadcasts, to the plurality of UEs, an inter-frequency measurement report request, requesting measurements for the second frequency. The first BS initiates at least one simultaneous group handover procedure of the plurality of UEs from the first BS to the second replacement BS.

Improvements in how to replace a first BS with a second BS are desired in relation to moveable BSs. Although replacement of a permanently positioned (fixed) BS typically occurs less frequently, also the replacement of such BSs can benefit from an improved replacement procedure.

SUMMARY

An object of the invention is to improve resource efficiency in relation to the scenario where one BS needs to be replaced by another BS.

This and other objects are met by means of different aspects of the invention, as defined by the claims appended hereto.

According to a first aspect, a first radio base station, BS, is provided, the first BS being operable to provide radio access to wireless devices, WDs, in a communication system. The first BS comprises processing circuitry configured to transfer, to a second BS by which the first BS is to be replaced, BS state information indicative of a BS state associated with operation of the first BS; stop transmission to/from all WDs to which the first BS is currently providing radio access; and transfer, to the second BS, WD state information 440 indicative of a plurality of WD states, wherein a WD state is associated with a respective WD of the all WDs.

According to a second aspect, a method of operating a first BS, which is to be replaced by a second BS, is provided. The method comprises: transferring, to the second BS, information indicative of a BS state associated with operation of the first BS; stopping transmission to/from all WDs to which the first BS is currently providing radio access; and transferring, to the second BS, information indicative of a plurality of WD states, wherein a WD state is associated with a respective WD of the all WDs.

According to a third aspect, a second BS is provided, the second BS being operable to provide radio access to wireless devices, WDs, in a communication system. The second BS comprises processing circuitry configured to: receive, from a first BS which the second BS is to replace, BS state information 430 indicative of a BS state associated with operation of the first BS; configure the second BS in accordance with the BS state information; receive, from the first BS, WD information indicative of a plurality of WD states, wherein a WD state is associated with a respective WD to which the first BS has hitherto provided radio access; and provide radio access to WDs, to which the first BS has hitherto provided radio access.

According to a fourth aspect, a method of operating a second BS, which is to be replaced by a first BS, is provided. The method comprises: receiving, from the first BS, BS state information indicative of a BS state associated with operation of the first BS; configuring the second BS in accordance with the BS state information; receiving, from the first BS, WD information indicative of a plurality of WD states, wherein a WD state is associated with a respective WD to which the first BS has hitherto provided radio access; and providing radio access to WDs, to which the first BS has hitherto provided radio access.

According to a fifth aspect, a computer program is provided. The computer program comprises computer-executable instructions for causing a BS to perform embodiments according to the second and/or fourth aspects, when the computer-executable instructions are executed on processing circuitry comprised in the BS. A computer program product, comprising a computer-readable storage media having the computer program of the fifth aspect embodied therein, is also provided According to a sixth aspect, a core network, CN, node is provided, the CN node forming part of a wireless communication system comprising a plurality of BSs. The CN node comprises processing circuitry configured to: identify a need to replace a first BS, which currently provides radio access to a plurality of WDs in the communication system; send, to the first BS, a swap-out request message comprising an indication of an upcoming replacement of the first BS; and send, to a second BS, a swap-in request message comprising a request for the second BS to replace the first BS.

According to a seventh aspect, a method performed by a CN node is provided. The method comprises: identifying a need to replace a first BS, which currently provides radio access to a plurality of WDs; sending 805, to the first BS, a swap-out request message 405; and sending 805, to a second BS, an instruction 410 to replace the first BS.

According to an eighth aspects, a computer program is provided. The computer program comprises computer-executable instructions for causing a CN node to perform the method according to embodiments of the seventh aspect, when the computer-executable instructions are executed on processing circuitry comprised in the CN node. A computer program product, comprising a computer-readable storage media having the computer program of the seventh aspect embodied therein, is also provided.

By the aspects described above is achieved that the replacement of one BS by another can be performed in a carrier resource efficient manner, without having to use any additional radio carriers or frequencies than the ones already used by the BS to be replaced. Hence, the methods and apparatus defined above can be used in communication systems having few, or even just one, carrier, since no hand-over of the WDs from one carrier to another is required.

Furthermore, since the replacement procedure is based on communication between network nodes (i.e. first and second BSs, and typically one or more CN nodes) and does not involve replacement-related signaling (such as hand-over signaling) to the served WDs, the replacement procedure can be fast, thus reducing the risk of radio link failure. Oftentimes in a replacement scenario, the first and second BSs will be positioned close to each other with good radio connection, thereby facilitating for a smooth signaling scenario. Furthermore, there is no need for Random Access (RA) or other hand-over related signaling with the WDs.

The above aspects provide a signaling efficient replacement procedure, since the WDs served by the first BS will not be involved in any additional signaling due to the replacement. Compared to a solution wherein an inter-frequency handover of WDs is performed from the first BS to the second BS, the WD battery usage will be significantly reduced, as well as interference. Due to the lower complexity of the above aspects compared to a solution based on inter-frequency handover, less interaction with an operation and maintenance system may also be required.

In some embodiments, the first BS determines an order between the plurality of WDs, in which order the information indicative of a WD state relating to different WDs will be transferred. The determining may be based on a respective priority indication of the plurality of WDs and/or on a priority indication relating to user plane data to be transmitted to/from the respective WDs. Hereby, the risk of losing important WD connection during the replacement procedure is reduced.

In some embodiments, at least two different parts of the replacement procedure are initiated at different points in time. For example, in one embodiment, the transferring of information indicative of a BS state is initiated at a first point in time, $T_1$; stopping of UL data transfers is initiated at a second, later, point in time, $T_2$, for any of the all WDs for which UL data transfer has not already been stopped; and the transfer of WD state information is initiated at a third, yet later, point in time, $T_3$, for of the all WDs. Hereby, balancing of the interruption time for active users and the time it takes to move the contexts is facilitated, and also the processing time needed to do the transfer. The distance in time between the different points in time when different parts of the procedure are initiated could be set in dependence of the current activity of the WDs to which the first BS is currently providing radio access. In one implementation, the CN node of the sixth aspect is configured to send trigger messages to the first BS at at least one of the first, second and third points in time. In another implementation, the first BS is configured to set a timer indicating at least one of the first, second or third point in time.

In some embodiments, transmission to/from a selection of WDs, to which the first BS is providing radio access, is decelerated or discontinued prior to the transferring of information indicative of a BS state having been initiated. Hereby is achieved that the time required for the transfer of WD states from the first BS to the second BS will be further reduced, thus reducing the risk of radio link failure for the remaining WDs being served by the first WD.

In some embodiments, the first and second BSs negotiate at which time the replacement is to take place. In other embodiments, the time for the replacement is determined by one of the first or second BSs, or by a CN node. By the first and second BSs negotiating the time for the replacement is achieved that the available resources can be more efficiently used. For example, in case of airborne BSs, the first BS may have a different battery level than expected at rendez-vous of the first and second BS, and by the first and second BSs negotiating the time for the replacement, the time for replacement can efficiently be selected in dependence of current battery level. In embodiments where different parts of the replacement procedure are initiated at different points in time, the negotiation of the time at which the replacement is to take place may include a negotiation of when the different parts of the replacement are to be initiated.

In order to avoid the risk of fraudulent base stations trying to get access to the communication system, the second BS is advantageously verified before the transfer of data from the first BS is initiated. In some embodiments, the first BS obtains an authentication key of the second BS; and verifies the authenticity of the second BS by use of the received authentication key.

In some embodiments, the second BS uses the same BS identity as the first BS in relation to the WDs and/or to a plurality of network nodes in the communication system. Oftentimes, the second BS can use the same identity as the first BS in relation to all network nodes but the first BS and any CN node which is directly involved in the replacement procedure. Hereby is achieved that the same links and interfaces to the plurality of network nodes can be used by the first and second BSs, and thereby, less backbone support will be required.

The transferring of information from the first BS to the second BS could for example be performed over a logically direct communication interface.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are helpful in order to elucidate the embodiments, wherein other parts may be omitted or merely suggested.

DETAILED DESCRIPTION

Figure 1:
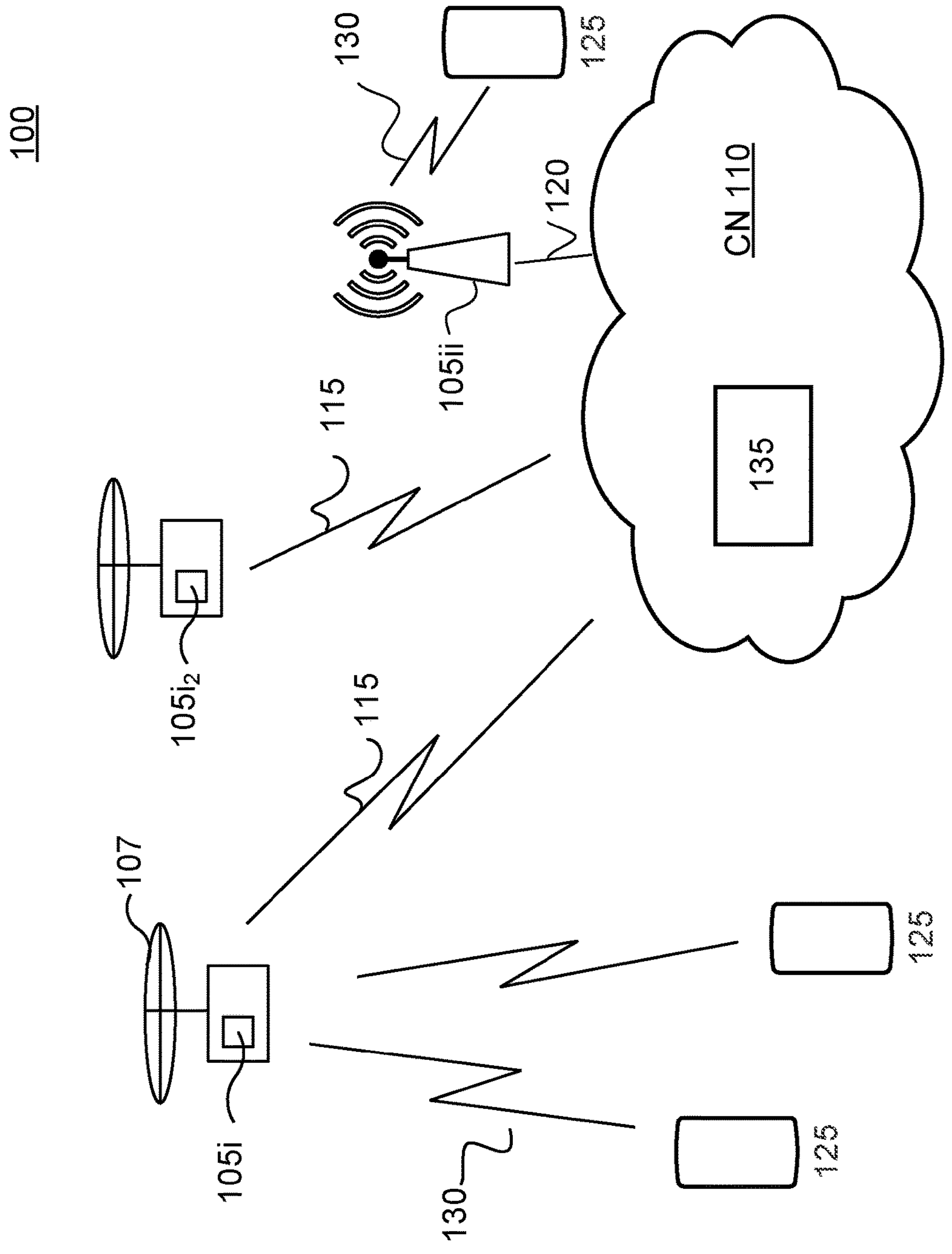
FIG. 1 illustrates a wireless communication system at a point in time when a first radio base station is to be replaced by a second radio base station.

An example of a wireless communication system 100 is schematically illustrated in FIG. 1. Wireless communication system 100, or system 100 for short, of FIG. 1 comprises radio BSs 105, which are connected to a Core Network (CN) 110. In FIG. 1, a moveable BS 105*i* and a fixed BS 105*ii* are illustrated as examples. Moveable BS 105*i* in the example illustrated in FIG. 1 is airborne and mounted on an UAV 107, such as a drone. Moveable BS 105*i* of FIG. 1 is connected to CN 110 via a wireless backhaul connection 115, while fixed BS 105*ii* is connected to CN 110 via a wired backhaul connection 120. Furthermore, CN 110 of FIG. 1 comprises a network node 135, which in the following will be referred to as managing server node 135 or managing server (MS) 135 for short.

FIG. 1 further illustrates a plurality of wireless devices (WDs) 125, which access the wireless communication system 100 via moveable BS 105*i* or fixed BS 105*ii* over a radio interface 130. The system 100 could include other types of BSs 105, such as airborne BSs 105 with a wired backhaul connection to the CN 110, or moveable BSs 105 which are mounted on other vehicle types, such as trucks or boats. A WD 125 could for example be a UE, an Internet-of Things (IoT) device, a wearable terminal device, a laptop, a vehicle-mounted equipment, or any other device capable of accessing system 100 via a BS 105.

As mentioned above, a need to replace a base station 105 with another base station 105 may arise, for example, in the case of an airborne BS 105 where the battery power is running low. In FIG. 1, communication system 100 is illustrated at a point in time when moveable BS 105*i* is to be replaced by a second moveable BS 10512.

In the following, efficient methods, devices and computer programs for replacing a base station 105 with another base station 105 will be described. In the description, first BS 105 will be referred to as BS1, while second BS 105 will be referred to as BS2. In the drawings, optional features are illustrated by dashed lines.

Figure 2A:
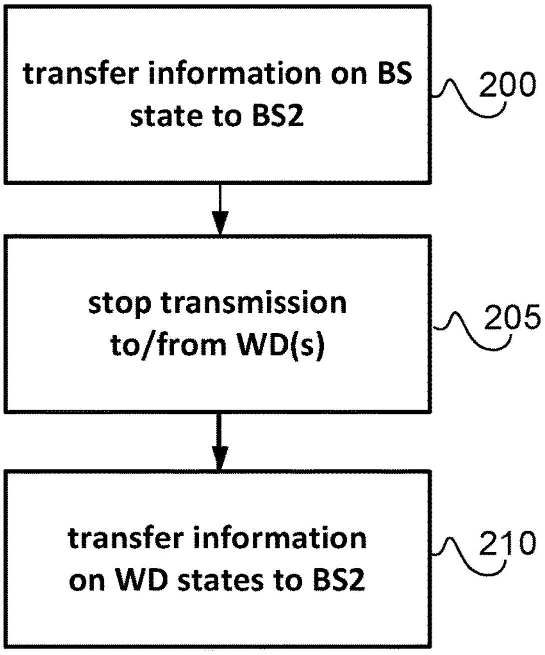
FIG. 2*a* is a flowchart illustrating an embodiment of a method performed by a first radio base station, which is to be replaced by a second radio base station.

FIG. 2*a* is a flow diagram illustrating a method performed by a first BS 105, BS1, where BS1 is to be replaced by a second BS 105, BS2. BS1 is active in wireless communication system 100 and providing access to one or more WD 125.

In the procedure illustrated in FIG. 2*a*, BS1 transfers information on its base station state to BS2, as well as information on the states of the WD 125, to which BS1 is providing radio access.

At 200, BS1 transfers information relating to its BS state to BS2. The information relating to the BS state of BS1, the BS state information, may include one or more of: a cell identity, e.g. a Physical Cell ID (PCI); a WD context, e.g. a UE context; a security context; one or more encryption keys, such as an encryption key pair or a single key which is shared by BS1 and BS2; a transport layer context; a CN context, for example a New Generation (NG) context or an S1 context; a Temporary Mobile Subscriber Identity (TMSI); a Timing Advance (TA) value; an E-UTRAN Cell Identity (ECI) or an E-UTRAN Cell Global Identity (EGI); a signal strength and/or quality report comprising a value indicative of e.g. a Received Signal Strength Indication (RSSI), a Reference Signal Received Power (RSRP), a Reference Signal Received Quality (RSRQ), and/or a UL Signal to Interference and Noise Ratio (UL SINR). The BS state transferred from BS1 to BS2 at 200 can be seen as the internal state of BS1, which is to be taken on by BS2 as its internal state.

In some embodiments, the transferring at 200 is part of a spooling procedure, wherein the spooling procedure further comprises the BS1 performing one or more of collecting, re-arranging and compressing the BS state information.

At 205, BS1 stops any transmission to and from the WDs 125 to which BS1 is providing radio access service. Hence, no more uplink (UL) grants and no more downlink (DL) data transfers will be transmitted from BS2. The data transfer between BS1 and WDs 125, as well as any transfer of user plane data between BS1 and the CN 100, is also stopped. In some embodiments, BS1, or MS 135, sends a stop indication to relevant node(s) in the CN 110, the stop indication indicating that any transmission of data to WDs 125 currently served by BS1 should be paused, i.e. temporarily stopped. Such indication could further indicate that any transmission to BS1 from nodes in CN 110 should also be paused.

At 210, BS1 transfers to BS2 information relating to a respective state of the set of WDs 125 currently being served by BS1, so as to provide BS2 with information necessary for taking over the responsibility for such WDs 125 from BS1. Such WD state information associated with a WD may include at least one of the following: information on a transmission (Tx) state of a transmission protocol; information on a reception (Rx) state of a transmission protocol; user plane data, e.g. in the form of Packet Data Unit(s) (PDU), to be transmitted to a WD 125 or be transmitted to the CN 110 from a WD 125; algorithms for flow control; information on a buffer of a transmission protocol, such as buffer status or a time measure of how long the PDU(s) have been waiting in the buffer; information on retransmission timers currently running, etc. Examples of transmission protocols, to which the transferred WD state information can relate, include Packet Data Convergence Protocol (PDCP) as defined in 3GPP TS38.323 v. 16.3.0; Radio Link Control (RLC) as defined in 3GPP TS38.322 v. 16.2.0; and Medium Access Control (MAC) as defined in 3GPP TS38.321 v. 16.4.0. When the transfer of WD state information at 210 is completed, BS1 has completed its part of the swap, although in some embodiments, it awaits a confirmation from BS2.

In some embodiments, the transferring of WD state information at 210 is part of a spooling procedure, wherein the spooling procedure further comprises the BS1 performing one or more of collecting, re-arranging and compressing the WD state information.

Figure 2B:
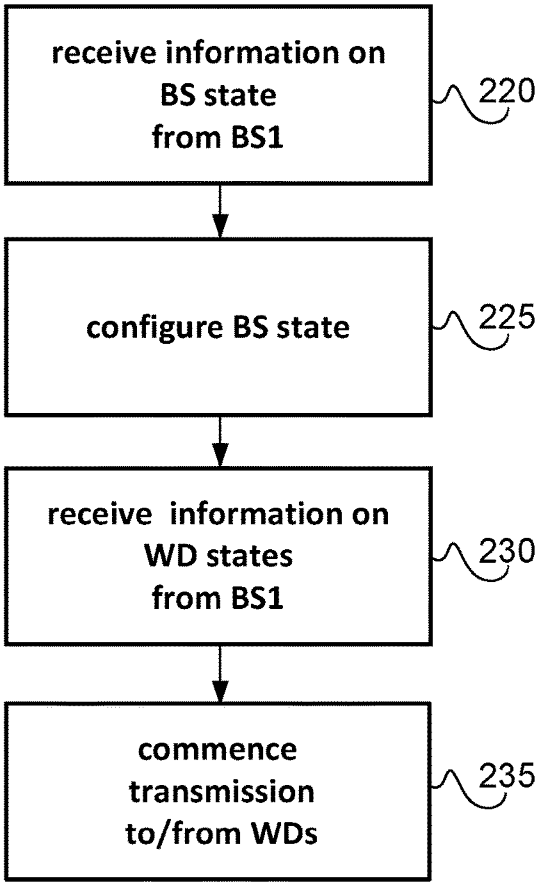
FIG. 2*b* is a flowchart illustrating an embodiment of a method performed by a second radio base station, which is to replace a first radio base station.

FIG. 2*b* is a flow diagram illustrating a method performed by a second base station, BS2, where BS2 is to replace a first base station, BS1.

At 220, BS2 receives, from BS1, information on the BS state transmitted by a BS1 at step 200. At 225, BS2 is configured in accordance with the information received at step 350, so as to create a BS state corresponding to the BS state currently configured in BS1.

At step 230, the information on WD states transmitted by BS1 at step 210 is received by BS2. This step could, if desired, be performed prior to step 225.

At 235, BS2 commences UL and DL transmission to/from WDs 125, on which information has been received at step 230. Hence, at 235, transmission of data is also commenced between BS2 and node(s) in CN 110, which cater for BS functionality and/or user plane functionality. In a 5G system 100, such CN node(s) could for example be a User Plane Function (UPF) and/or an Access and Mobility Management Function (AMF). In an embodiment wherein the identity (e.g. Cell Global Identity (CGI)) used by BS2 is the same identity as was used by BS1 for the corresponding communication, the transition to BS2 will be seamless to such nodes. In embodiments wherein the transmission of data from the CN 110 has been paused, a start indication, indicating that transmission to WDs 125 (which were previously served by BS1) can be resumed, is sent to the CN 110. Such start indication is, in one implementation, sent by BS2. In another implementation, the start indication is sent by MS 135. In embodiments where different identities are used for BS1 and BS2, such start indication could advantageously include both identities. Step 235 may include that BS2 signals to BS1, either directly or via MS 135, that BS2 has taken over responsibility for the WDs 125.

Step 235 may for example be entered upon completion of steps 225 and 230. However, the transfer of service for WD connections, from BS1 to BS2, may alternatively be gradually performed, so that some WDs 125 would still be served by BS1, while for other WDs 125, connections have already been transferred to BS2.

Figure 3A:
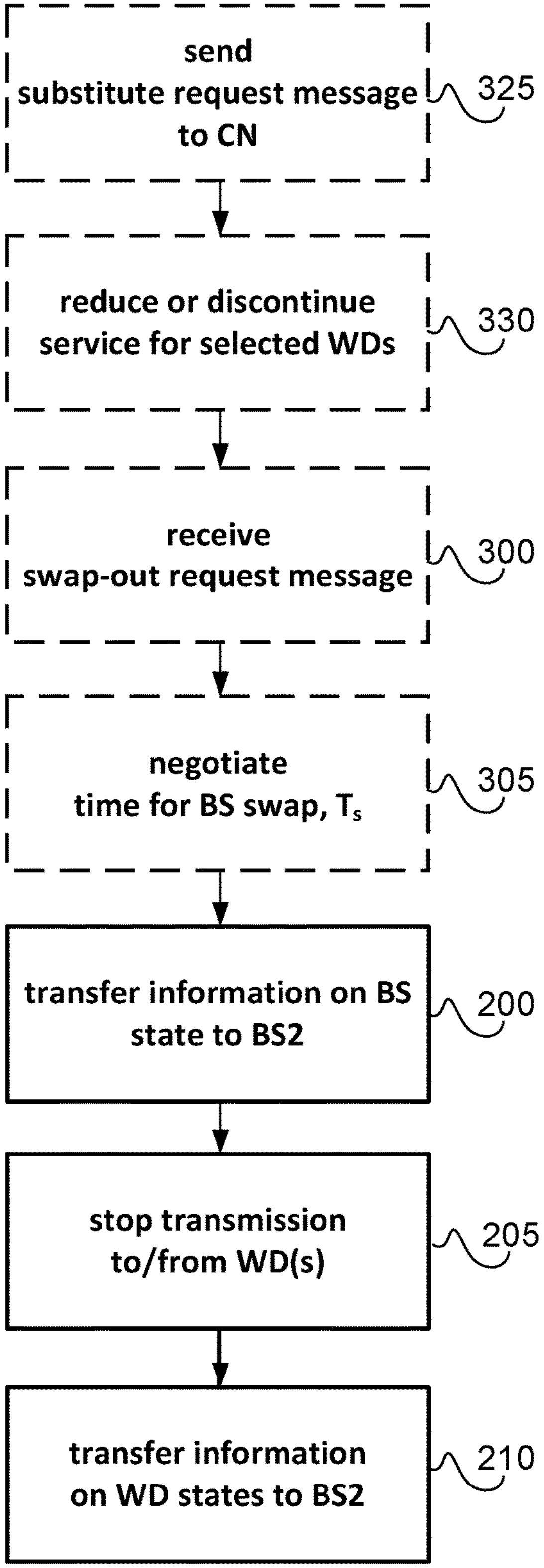
FIG. 3*a* is a flowchart illustrating further embodiments of a method performed by a first radio base station, which is to be replaced by a second radio base station.
Figure 3B:
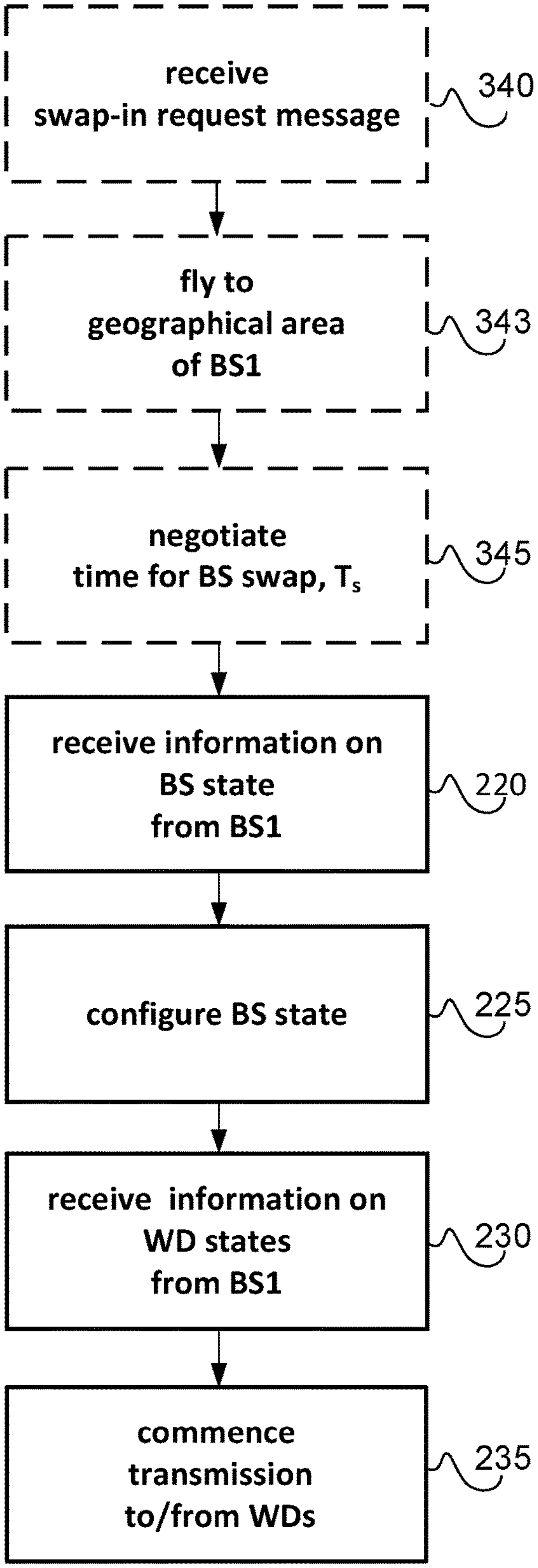
FIG. 3*b* is a flowchart illustrating further embodiments of a method performed by a second radio base station, which is to replace a first radio base station.

In FIG. 3*a* and FIG. 3*b*, examples of embodiments of the methods of FIG. 2*a* and FIG. 2 are presented. In these figures, dashed lines indicate optional steps.

FIG. 3*a* is a flowchart illustrating some embodiments of a method of operating a first BS 105, BS1, which is to be replaced by a second BS 105, BS2. At 300, BS1 receives a swap-out request message. The swap-out request message comprises an indication indicative of upcoming replacement of BS1 with BS2, such replacement also referred to as a swap of BS1 to BS2, or BS swap for short. The swap-out request message is typically received from CN 110, for example from a MS 135 in the CN 110. Alternatively, the message could be received from BS2.

The receipt of a swap-out request message of step 300 is one way for BS1 to obtain an indication of an upcoming replacement event. In other embodiments, an indication of an upcoming replacement of BS1 to BS2 can be obtained in other ways, for example from an internal process in BS1.

At 305, BS1 obtains an indication of a point in time, at which the replacement event is to take place, by a negotiation procedure with BS2. In the following, the point in time for the replacement event, $T_s$, also referred to as the swap-time, refers to the point in time at which BS2 goes live and thereby takes responsibility for the WD(s) 125 previously served by BS1. In one embodiment, $T_s$ is determined by BS1, and communicated as a value of a parameter in a message to BS2. In another embodiment, the value of $T_s$ is received by BS1 from BS2. An indication of the swap-time, $T_s$, may further be obtained in other ways. In one embodiment, the indication of $T_s$ is transmitted as a value of a parameter in the swap-out request message received at 300.

In some embodiments, for example where the indication of an upcoming swap is obtained from internal processes in BS1, the receipt of a swap-out request at 300 is preceded by BS1 requesting a BS swap by sending, to the MS 135, a substitute request message as illustrated at 325 in FIG. 3*a*. The sending of such substitute request message could for example be triggered by BS1 having obtained an indication of an upcoming swap by having estimated that a remaining battery level is low, or by BS1 detecting any other circumstance that reduces the capacity of BS1 to provide radio services to WDs 125, such as malfunction or errors in BS1. In case BS1 is an airborne BS 105, the sending of a substitute request message can be triggered by BS1 determining that the expected remaining airtime is below a certain threshold level; by BS1 finding itself in a vortex ring state; by malfunction of the aircraft, etc. In another embodiment, the decision to perform a BS swap is taken in CN 110, for example in a MS 135. In this embodiment, step 325 could be omitted, or replaced by, for example, the BS1 transmitting a message to the CN 110 comprising information on the expected remaining battery time, which the MS 135 could use in determining whether or not a BS swap is necessary.

In an embodiment where BS1 is an airborne BS, the expected remaining battery time may be estimated in dependence of one or more of the following: remaining battery level, motor power consumption, the number of WD 125 served by BS1, the data volume served by BS1, etc.

In one embodiment, the service provided to a selection of the served WDs 125 is reduced or discontinued at step 330, prior to transferring of the BS state to BS2 at step 200. In case of discontinued transmission, the WDs 125 would typically still be served by BS1, for example, by means of a Radio Link Control (RLC) signaling connection. In one implementation, the WDs 125 for which the service is reduced/discontinued are selected by MS 135 and signaled to the BS1, for example in a swap-out request message, or in a separate message. In another implementation, BS1 selects WDs 125 for which the service is reduced or discontinued. The selection of a WD 125 as a candidate for which services are to be stopped, or reduced, can for example be performed based on a user data specific priority indication and/or on a WD specific priority indication, cf. the prioritization described below in relation to step 210. Reducing a service provided to a WD 125 comprises reducing the transmission rate, i.e. decelerating the transmission to the WD 125.

In this embodiment, the selection of WDs 125 for which services are to be discontinued or reduced can be performed by BS1, for example after having sent a substitute request message to the MS 135 as shown in FIG. 3*a*, or after having received the swap-out request message at 300. Alternatively, the selection could be performed by the MS 135 and signaled to BS1, for example in the swap-out request message.

By reducing the data rate for one or more WDs 125, and/or remove one or more WDs 125 from the set of WDs 125 currently being served by BS1, the time required for the transfer (or spooling) of WD states from BS1 to BS2 at step 200 can be reduced, thus reducing the risk that the swap will result in radio link failure for the remaining WDs 125 being served by the first WDs 125.

The number of WDs 125 served by BS1 is oftentimes large. In order to reduce the risk of losing important WD connections, the order, in which the WD state transfer of different WDs 125 is performed at step 210, is in some embodiments such that the WD state of a higher prioritized WD 125 is transferred at an earlier time than the WD state of a lower prioritized WD 125. This can for example be relevant when BS1 is an airborne BS with low battery power, and there is a risk that the BS1 will run out of power before the WD state of all served WDs 125 have been transferred. As an example, a WD 125, which is involved in high priority communications, such as National Security Public Safety (NSPS)/Emergency communications, may be given high priority in respect to WDs 125 involved in less prioritized communications.

The determination of an order in which the WD state transfer is performed for different WDs 125 may for example be based on a WD specific priority indication associated with a WD125 and/or its subscription, such as an Allocation Retention Priority (ARP) value of the WDs 125 (as specified in 3GPP TS23.501 v. 16.8.0) or information relating to the activity of a WD 125; and/or on a user data specific priority indication associated with the user plane data currently being transmitted to/from the WDs 125, such as a Quality of Service (QoS) of the bearers on which BS1 sends/receives data to the respective WDs 125. Information relating to the activity of the WDs 125, WD activity information, could for example include information on the amount of power required from BS1 for the transmission to/from the respective WDs 125, for example in comparison to a power threshold, or based on a power-consumption ranking of the currently served WDs 125; on the speed and/or position of the WD 125 in relation to BS1 (such WD 125 would be expected to soon become a hand-over candidate); and/or on the connection activity of the respective WDs 125, etc. As an example: a high-power-consuming WD 125 could in one implementation be given a higher priority in the WD context transmission, so that such WD 125 can as soon as possible be transferred to BS2, thus reducing the power consumption in BS1. In another implementation, a high-power-consuming WD 125 could be given a lower priority, and the transmission to such WD 125 could be decelerated or discontinued before the transfer of the BS state information (cf. step 330 discussed below).

In embodiments where the prioritization of WD state transfer is based on a user data specific priority indication as well as on a WD specific priority indication, highly prioritized user plane data (e.g. data on a high priority QoS bearer) relating to a WD 125 having a low priority could, in some implementations, be transferred to BS2 before the transfer of low priority user plane data (e.g. on a low priority QoS bearer) relating to a WD 125 having high priority. When WD activity and/or user plane data is taken into account in the prioritization of the WD state transfer, the prioritization may be dynamic, in view of any activity change, or of any user plane data received by BS1 for further transmission to WDs 125 during the BS state transfer at 210.

The swap-time $T_s$, and/or a remaining airtime in case of an airborne BS1, may also be taken into account in the scheduling of WD state transfers of BS1, in order to avoid that the most important information is lost due to radio link failure. For example, a WD 125 that has data to receive or to send may be given higher (or lower) scheduling priority prior the $T_s$, depending on the priority of the data and/or the WD 125.

If desired, the information of the WD state of one or more particular WDs 125 could be transferred from BS1 to BS2 when the transmission to/from such particular WD(s) 125 has been stopped at step 205, even if the transmission to/from other WDs 125, currently served to BS1, has not yet been stopped. Hence, in such embodiment, steps 205 and 210 can be performed by BS1 in parallel. By performing steps 205 and 210 in parallel, the time duration during which the WDs 125 will be unable to send or receive information will be reduced.

FIG. **3*b* is a flowchart illustrating some embodiments of a method of operating a second BS 105, BS2, which is to replace a first BS 105**, BS1.

At step 340 of FIG. **3*b* BS2 receives a swap-in request message. The swap-in request message comprises an indication indicating that BS2 is to replace BS1 within the near future. The swap-in request message is typically received from CN 110, for example from a MS 135**. The receipt of a swap-in request message is one way for BS2 to obtain a swap-in indication, i.e. an indication of an upcoming swap. In other embodiments, a swap-in indication is received via a user interface.

In a scenario where BS1 and BS2 are airborne BSs, the method would typically include step 343, wherein BS2 flies to a geographical location in the vicinity of BS1. In another scenario, BS2 can be brought manually to the location of BS1.

At 345, BS2 obtains an indication of the swap-time $T_s$ by means of a negotiation procedure with BS1. In one embodiment, $T_s$ is determined by BS2, and communicated as a value of a parameter in a message to BS1. In another embodiment, the value of $T_s$ is received by BS2 from BS1. An indication of the swap-time, $T_s$, may further be obtained in other ways. In one embodiment, the indication of $T_s$ is transmitted as a value of a parameter in the swap-in request message received at 340.

The value of the swap time $T_s$ obtained by BS1 and BS2 is the same. Typically, for both BS1 and BS2, the indication of $T_s$ is provided as a value of the actual time for the swap, e.g. 7:00:00, e.g. in accordance with the standard IEEE 1588-2019—IEEE Standard for Precision Clock Synchronization Protocol for Networked Measurement and Control Systems". Alternatively, the swap-time $T_s$ could be defined in relation to an event, such as the receipt of a swap-in request message, or, for BS2, the receipt of a swap-out request message.

In some embodiments, the completion of corresponding steps 210/230 of WD state information transfer would have taken place on or before the point in time for the swap $T_s$. However, in one embodiment, BS1 and BS2 can re-negotiate the value of $T_s$, for example in a scenario where the transfer of information cannot be completed before the time $T_s$. This scenario is further described in relation to FIG. 5.

The transferring of information from BS1 to the BS2 could for example be performed over a logically direct communication interface, e.g. over an X2 or an Xn interface as specified by 3GPP TS 36.420 16.0.0 and 3GPP TS38.420 16.0.0, respectively, or a logically direct communication interface of another communication standard, such as a future 6G standard.

Figure 4:
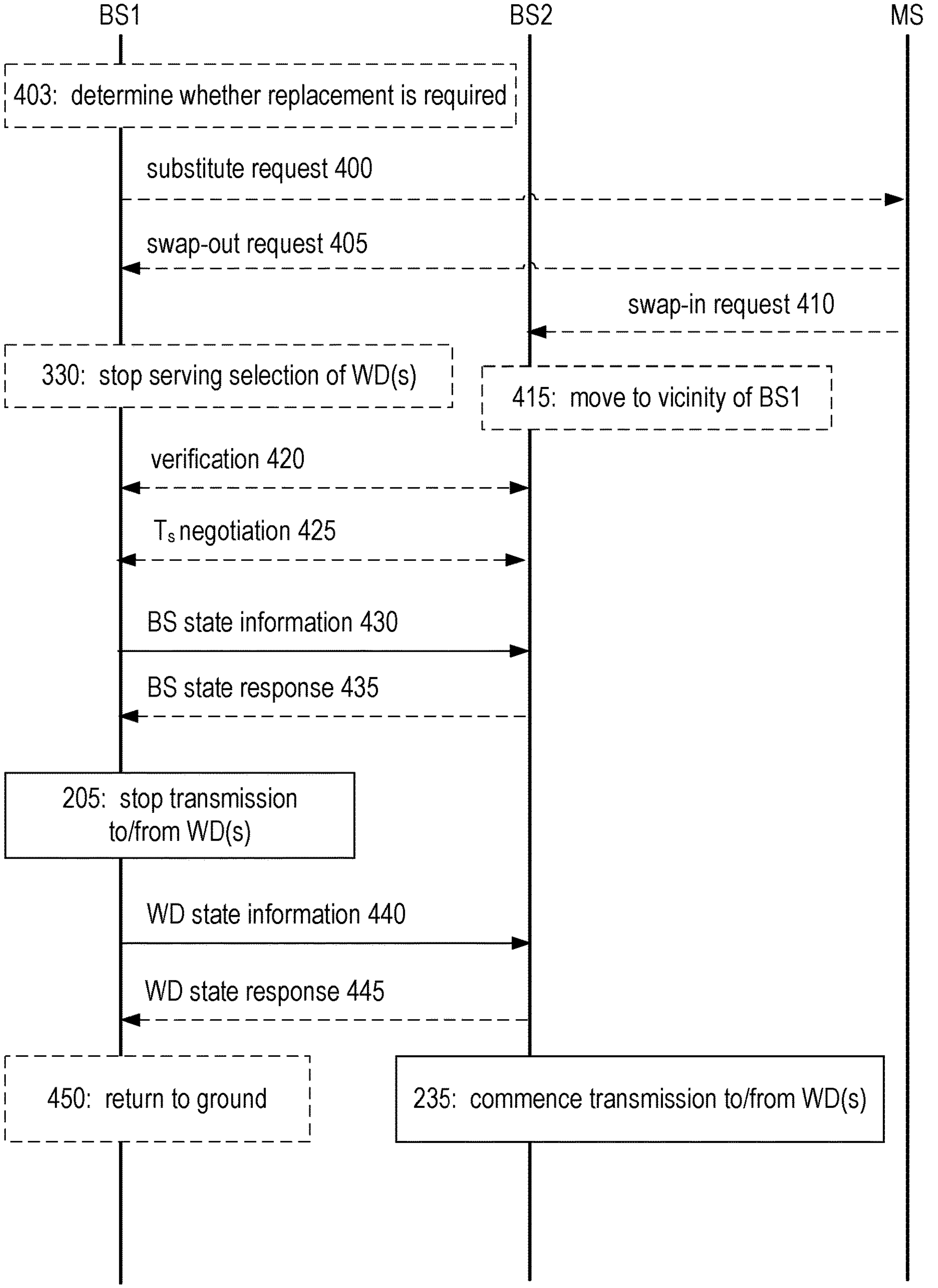
FIG. 4 is a signaling diagram illustrating embodiments of the invention.

FIG. 4 is a signaling diagram illustrating actions taken and messages sent between BS1, BS2 and CN 110 (illustrated by MS 135) in an embodiment of the BS swap procedure. Optional messages and actions are indicated with dashed lines.

In the embodiment of FIG. 4, the swap procedure is initiated by BS1 sending a substitute request message 400 to the MS 135, the substitute request message 400 comprising an indication that a first base station BS1 requires to be replaced by a substitute base station BS2. Such substitute request message 400 is triggered in FIG. 4 by the BS1 determining, at 403, that a replacement is required. Such determination could for example be based on the determination that a remaining battery level is below a certain threshold, or by BS1 detecting any other circumstance that reduces the capacity of BS1 to provide radio services to WDs 125, such as malfunction or errors in BS1.

In response to receipt of the substitute request message 400, MS 135 sends a swap-out request message 405 to BS1, and a swap-in request message 410 to BS2. In another embodiment, the BS1 could send a status information message to MS 135 (not shown), instead of the substitute request message 400. Such status information message would comprise an indication of the BS status, for example an indication of battery level, thus providing MS 135 with information on which a decision on whether or not to replace BS1 with a second BS2 can be based. In yet another embodiment, the MS 135 can initiate the BS swap without having first received any message from BS1. In this embodiment, the determining at 403 and the substitute request message 400 could be omitted.

In FIG. 4, the swap-out request 405 is illustrated as being sent from MS 135 at an earlier point in time than swap-in request 410. However, this order could be reversed, or the messages 405 and 410 could be sent at the same time.

In response to the receipt of swap-in request 410, BS2 of FIG. 4 performs the action 415 of moving to a geographical location in the vicinity of BS1. When BS1 and BS2 are airborne BSs 105, this would typically involve BS2 flying to the location where BS1 is currently positioned. The positions of BS1 and BS2, respectively, can for example be established via by triangulation of radio signals; via a Global Navigation Satellite System (GNSS) such as the Global Positioning system (GPS) in combination with an altitude meter, or in any other suitable manner. In some embodiments, the action 415 of BS1 moving autonomously to a location in the vicinity of BS2 can be omitted. This is for example the case when BS1 is fixed at a known location, and BS2 is manually brought to the location of BS1.

Upon receipt of the swap-out message 405, BS1 of FIG. 4 performs the optional step 330 of selecting a set of currently served WD(s) 125 for which the services provided by BS1 is reduced or completely stopped (cf. FIG. 3*a*).

At rendez-vous of the BS1 and BS2, a verification procedure 420 is advantageously performed between BS1 and BS2, such verification procedure 420 comprising verification of identity and/or verification of presence. Verification procedure 420 comprises sending a verification message from one of BS1 and BS2, and, typically, also the sending of a verification response message from the one of BS1 and BS2 that was the recipient of the verification message. Prior to having received the swap-in request message 410, BS2, which is to replace BS1, has typically been authenticated by a procedure in an Operations, Administration and Maintenance (OAM) system of the CN 110. For this purpose, existing OAM procedures, such as those described in 3GPP TS 33.501 (v 17.1.0) section 5.3.4 or 3GPP TS 33.310 (v 16.7.0), section 9 or section F1, could for example be used. The verification procedure 420 can thus make use of any authentication keys verified by the OAM system. At least one authentication key of BS2 could for example be included in the swap-out request 405 sent by MS 135 to BS1, and at least one authentication key of BS2 could be included in the swap-in request message 410. Alternatively, such public authentication keys could be included in any other message, such as a separate message having the sole purpose of signaling a authentication key.

Verification procedure 420 could, as mentioned above, include verification of presence, so as to determine whether BS2 is in the vicinity of BS1. In one embodiment, such verification of presence comprises the signaling of GNSS/GPS measurement results from the BS1 and BS2 to the MS 135, which sends presence verification results to the respective base stations BS1 and BS2. In another embodiment, verification of presence is achieved by means of beacon technology signaled directly between BS1 and BS2, for example Bluetooth presence detection. Other ways of verifying presence can alternatively be used, such as NR sidelink detection. This could for example be suitable if the BS1 and/or BS2 is an Integrated Access and Backhaul (IAB) BS. In presence verification procedures where the MS 135 is not involved, the BS1 and/or BS2 informs the MS 135 about the presence of the other BS. The signaling of positions between MS 135 and BS1 or BS2, respectively, can be performed in a known manner, for example in accordance with section 9.2.10 of 3GPP TS 38.455 (v. 16.3.0), and is not shown in FIG. 4.

The verification procedure 420 is shown in FIG. 4 to be performed after step 330, however the procedure could alternatively be performed before or at the same time as step 330, in embodiments where step 330 is included in the method. Furthermore, in some embodiments, for example when BS2 is manually brought to the locality of BS1, the verification procedure 420 could be omitted.

When the verification procedure 420 has been successfully performed, a communications channel between BS1 and BS2, via CN 110, can be established, for example by the standardized set-up procedure for an X2 (4G) or XN (5G) interface.

The OAM system mentioned above in relation to the verification procedure 420 could in one embodiment be, or include, the MS 135.

In the embodiment illustrated in FIG. 4, steps 305 and 345 are implemented via a swap-time negotiation procedure 425 performed by BS1 and BS2, whereby BS1 and BS2 agree on the point in time $T_s$ when the swap is to take place. An example of how this procedure 425 could be performed is further described in relation to FIG. 5.

Information on the BS state of BS1, as described in relation to step 200 of FIG. 2*a* and step 220 of FIG. 2*b*, is then transferred from BS1 to BS2 in one or more BS state information message 430. In some embodiments, in response to such BS state information message 430, BS2 sends a BS state response message 435. If desired, an BS state ACK message (not shown) could then be sent to from BS1 to BS2.

In FIG. 4, it is illustrated that step 205, wherein transmissions to/from WDs 125 from/to BS1 are stopped (cf. FIGS. 2*a* and 3*a*), is performed after the completion of the transfer of the BS state information to the BS2. This step could alternatively be performed before or during the BS state transmission from the BS1 to BS2. However, by performing the BS state information transfer prior to step 205, the time duration during which the WDs 125 will be unable to send or receive information will be reduced, and therefore, also the risk of radio link failure.

Information on WD states of the WDs 125 currently being served by BS1 is then transferred from BS1 to BS2 in one or more WD state information messages 440 (cf. steps 210 and 225 of FIG. 2*a*/3*a* and 2*b*/3*b*, respectively). In some embodiments, in response to such WD state information message 440, BS2 sends a WD state response message 445. If desired, an WD state ACK message (not shown) could then be sent to from BS1 to BS2.

By transferring WD state information in relation to the WDs 125 served by BS1 from BS1 to BS2, the responsibility for the WDs 125 has been handed over to BS2. BS2 then becomes the serving BS for the WDs 125. In step 235, BS2 commences data transfer to/from the WDs 125, as well as data transfers to/from CN 110. Any possible glitch in data transfers between BS1 and BS2 may for example be handled by known application retransmission functionality.

In the embodiment illustrated in FIG. 4, the swap-time $T_s$ denotes a time when the contexts transfers must be completed, as $T_s$ is the time when BS2 goes live and BS2 has taken over the functionality of BS1. In another embodiment, BS2 can commence transmission to/from a particular WD 125 even if BS2 is still receiving WD state information in relation to other WDs 125. In this embodiment, the swap-time $T_s$ denotes the swap-time for a subset of the WDs. Hence, in such embodiment, steps 230 and 235 can be performed in parallel. By performing steps 230 and 235 in parallel, the time duration during which the WDs 125 will be unable to send or receive information will be reduced.

When BS1 has transmitted the last WD state information message 440 to BS2, BS1 has completed the swap, and can power off the cellular communication functionality. In case BS1 is an airborne BS, BS1 can then return to ground as shown in FIG. 4 by step 450. In fact, step 450 could be performed as soon as step 205 has been completed, as long as the wireless backhaul connection 115 is operable.

From the perspective of the MS 135, the BS1 and BS2 are two separate entities, while for many other nodes and services in CN 110, the BS1 and BS2 are indistinguishable, so that a swap can take place with most of the components of the wireless communication system 100 remaining uninformed of the swap. Such shared identity of the BS1 and BS2 in view of CN 110 can, in one embodiment, be achieved by using the same IP address in the transport network for the two base stations BS1 and BS2. In this embodiment, separate identities of BS1 and BS2 in view of the MS 135 can be achieved by the use of separate identification serial numbers for the two BSs 105. In other embodiments, other means can be used for achieving a scenario of semi-shared identity, where BS1 and BS2 have different identities in view of MS 135, while having the same identity in view of most (or all) other entities in CN 110.

Figure 5:
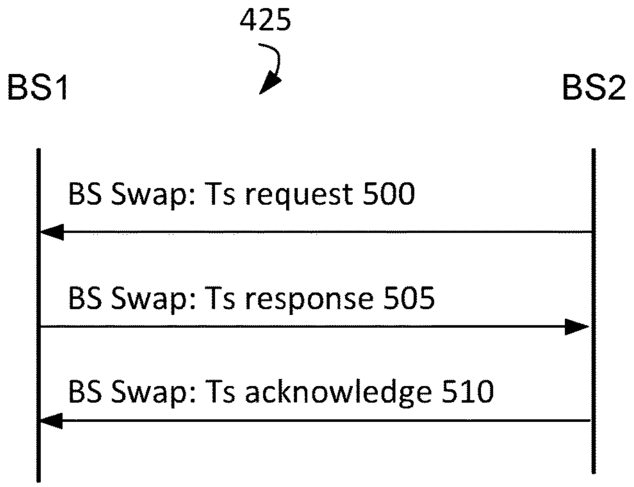
FIG. 5 is a signaling diagram illustrating an embodiment of a procedure for establishing a point in time for a base station swap.

In FIG. 5, an embodiment of the swap-time negotiation procedure 425 is illustrated, the procedure being illustrated as part of a BS Swap procedure. In the embodiment shown in FIG. 5, the swap-time negotiation procedure 425 is initiated by BS2, which sends a $T_s$ request message 500 to BS1. BS1 responds by sending a $T_s$ response message 505 to BS2. BS2 then acknowledges by sending a $T_s$ acknowledge message 510 to BS1. In one implementation, $T_s$ request message 500 includes an indication of a plurality of suggested times $T_s$ for the swap, while $T_s$ response message 505 includes a swap-time $T_s$ selected by BS1 out of the plurality of suggested times $T_s$. In another implementation, $T_s$ request message 500 simply includes a request for the swap, while BS1 decides on the swap time $T_s$ and includes an indication of the same in the $T_s$ response message 505, or the response message 505 includes more than one suggested value of $T_s$.

In one embodiment, the $T_s$ request message 500 comprises information relating to the geographical location of BS2, to be used in presence verification.

In the signaling diagram of FIG. 5, a $T_s$ request message 500 is transmitted from BS2 to BS2. In another implementation, BS1 initiates the swap-time negotiation procedure 425 by sending a $T_s$ request message 500 to BS2. In this implementation, the presence of BS2 in the vicinity of BS1 is advantageously verified in a separate verification procedure 420.

The swap-time negotiation procedure 425 of FIG. 5 could in some embodiments also be used for re-negotiating the swap-time, as mentioned above in relation to FIG. 3*a*/3*b*.

Figure 6:
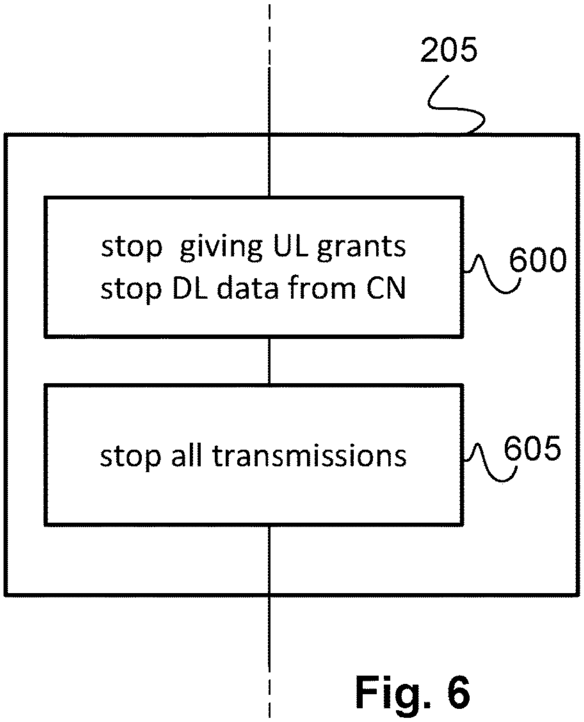
FIG. 6 illustrates an example implementation of stopping transmission to/from WDs.

In one embodiment, the BS Swap procedure, of which a swap-time related message exchange is illustrated in FIG. 5, is further defined to include the exchanges of BS state information message 430/BS state response message 435 and/or the exchange of WD state information 440/WD state response message 445 between BS1 and BS2. The BS Swap procedure could also be defined to include signaling between BS1 and BS2 indicating that the swap has been successful and that BS2 can go live (such signaling not shown):

FIG. 6 illustrates of an embodiment of step 205 performed by the first base station BS1, in which step the transmission to/from the WDs 125 served by BS1 is stopped. In the embodiment of FIG. 6, step 205 is divided into two different steps: First, the scheduling of data transfers to/from the WDs 125 is stopped in 600, in that UL data transfers, as well as DL data transfers intended for WDs 125 and transmitted from the CN 110 via BS1, are stopped. The stopping of UL data transfers typically comprises of the stopping of UL grants. Then, all transmissions to/from WDs 125, i.e. the transfer of user data that has been scheduled prior to stopping the UL grants and the data transmission from the CN 110, are stopped in 605. In some embodiments, DL data for the WDs is then still received from CN 110 and buffered in BS1 until the data can be transferred to BS2 for further transmission to the WDs 125. In other embodiments, the stopping of DL data from the CN 110 is performed by signaling to the CN 110 that CN 110 should (temporarily) stop any data transmission to the WDs 125. In such embodiments, BS2 would typically signal to the CN 110, at step 235, that CN 110 should resume any transmission to the WDs 125. In such embodiments, the existing CN-RAN interface could be updated, for example by including a new information or control element in an existing message of a CN-RAN protocol (e.g. of NG-AP or S1-AP as defined in 3GPP TS TS 38.413 v. 16.5.0 and 3GPP TS 36.413, v. 16.5.0, respectively), or by introducing a new message to such CN-RAN protocol. In yet further embodiments, MS 135 is responsible for sending stop and start messages to relevant nodes in CN 110.

In other embodiments, step 600 is performed in parallel with step 605, or after step 605.

In some embodiments, a RLC signaling connection or similar between BS1 and WDs 125 is maintained until BS1 has received an indication that BS2 has taken over responsibility for the WDs 125.

Figure 7:
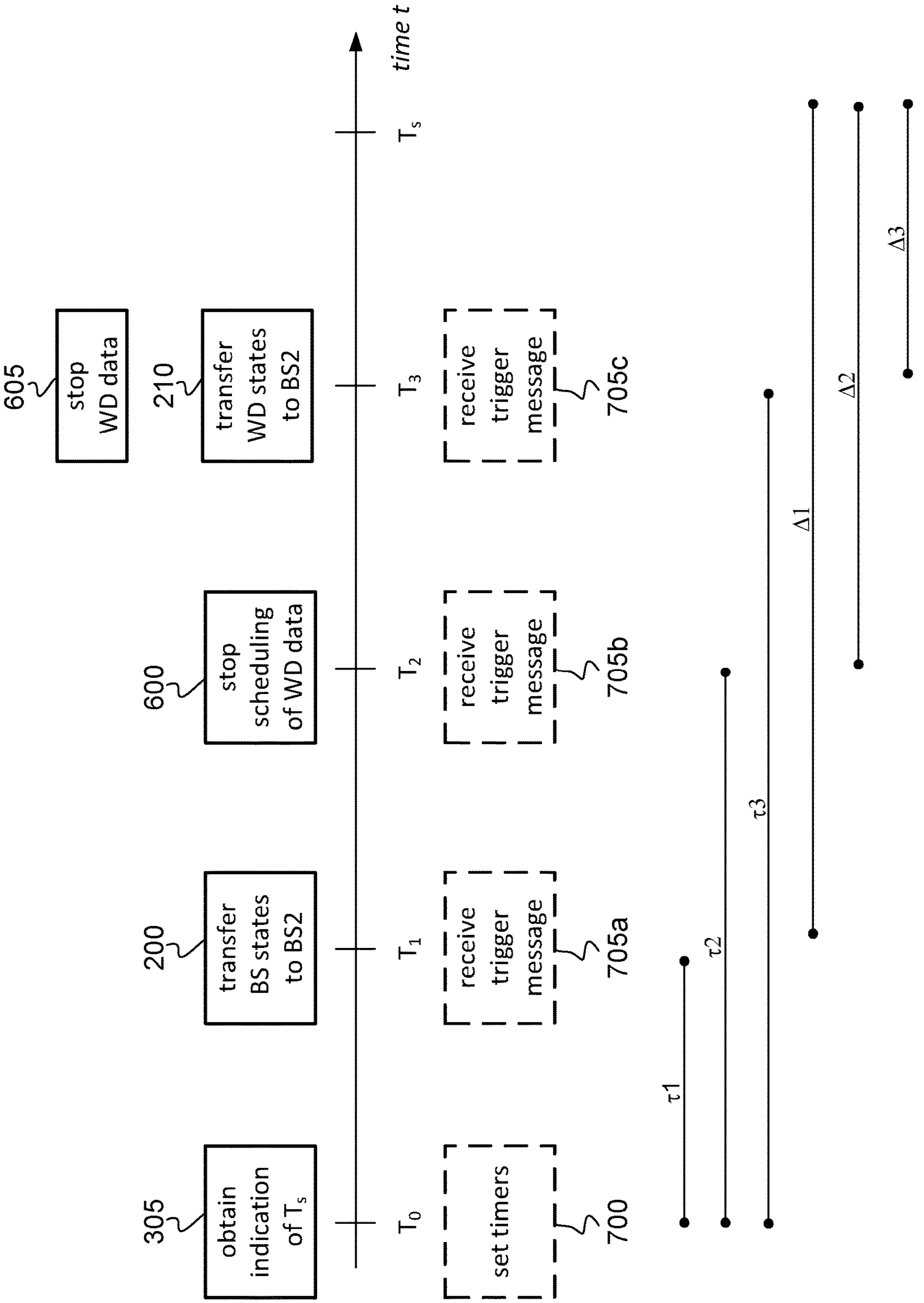
FIG. 7 is a timeline illustrating, for some embodiments, a sequence of events in a radio base station to be replaced.

FIG. 7 is a timeline illustrating an example of a flow of events in a BS swap procedure, from the perspective of a first base station BS1 and in an embodiment where step 600 is performed prior to step 605. In this example, different parts of the replacement procedure are initiated at different points in time. At time $T_0$, BS1 of FIG. 7 obtains an indication of the swap-time $T_s$ (step 305). At time $T_1$, BS1 starts to transfer, to BS2, information relating to its BS state (step 200). At time $T_2$, BS1 stops the scheduling of UL grants for connected WDs 125, and also stops DL data transfers from CN 110 and intended for WDs 125 (step 600). In an alternative embodiment, the scheduling of WD data is stopped at step 600 prior to, or at the same time as, the BS state information being transferred to BS2 at step 200. At time $T_3$, BS1 stops all transmissions to WDs 125 and to CN 110 (step 605) and starts transferring, to BS2, information relating to WD states (step 210). In an alternative embodiment, the transfer of WD data at 210 could start, for some WDs 125, prior to stopping the transmission of WD data at 605 for other WDs 125. In yet another embodiment, the data transmission to/from WD 125 is stopped at a time prior to the commencing of WD state transfer to BS2 at step 210. At time $T_s$, the transfer of WD states of step 210 is completed. The substitute, second base station BS2 may then enter step 235, wherein transmission to/from WDs 125 is commenced.

As illustrated in FIG. 7 by optional step 700, BS1 could set suitable timers, the expiry of which would trigger an event in BS1. For example, upon obtaining the indication of $T_s$ at time $T_0$, a timer could be set for the initiation of each of one or more of the following events: the transfer of information on BS state from BS1 to BS2 (step 200); the stopping of transmissions to/from WDs 125 from/to BS1 (step 205); and/or the transfer of information on WD states to BS1 from BS2 (step 210). The timers could be set to expire when a particular period of time has passed since the timer was set at step 700, as indicated by the time spans τ1, τ2 and τ3 in FIG. 7. Alternatively, the timers could be set to expire at a particular point in time defined with reference to the swap-time $T_s$, as illustrated by the time spans Δ1, Δ2 and Δ3 in FIG. 7 ($\Delta1>\Delta2>\Delta3$). In this alternative, a timer in relation to step 200 would be set to expire at time $T_s-\Delta1$; a timer in relation to step 600 would be set to expire at time $T_S-\Delta2$ and a timer in relation to steps 605/210 would be set to expire at time $T_S-\Delta3$.

The initiation of steps 200, 600 and 605/210 could alternatively be triggered by the receipt of a trigger message at BS1, as illustrated in FIG. 7 by optional steps 705*a*, 705*b* and 705*c*. A trigger message could for example have been sent by MS 135 or BS2 (where the sending of such message could for example have been initiated by the expiry of a timer). Also, a combination of timer expiry and message reception could be used for triggering actions in BS1.

Timers and/or triggering messages is in one embodiment also implemented in relation to one or more events performed by BS2. For example, step 235, wherein BS2 commences transmission of data to/from WDs 125, could be triggered by the expiry of a timer or the receipt of a trigger message at time $T_s$.

In one embodiment, BS1 and BS2 negotiate the time for $T_1$, $T_2$ and/or $T_3$, in addition to the swap-time $T_s$.

Figure 8:
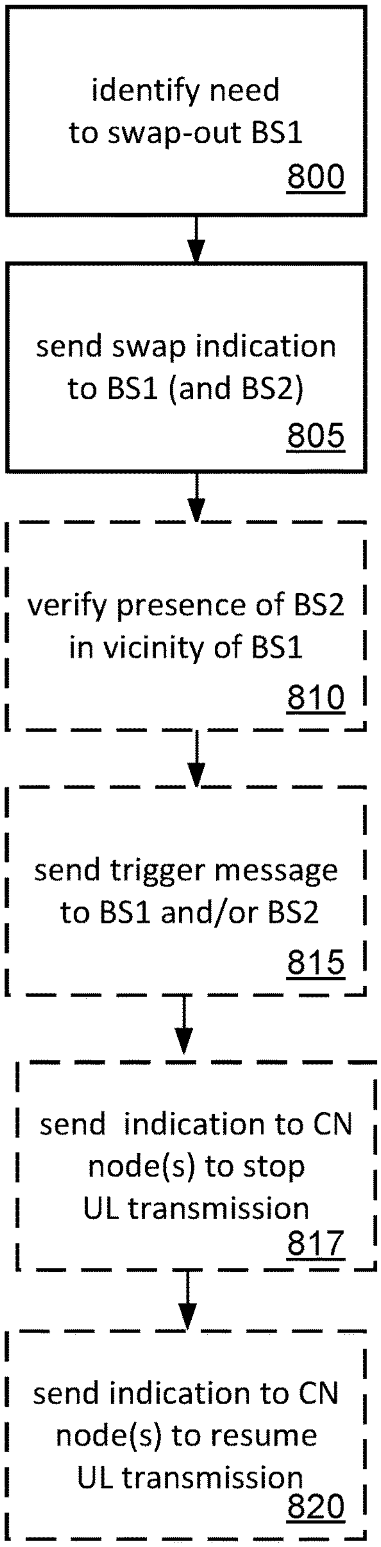
FIG. 8 is a flowchart illustrating embodiments of a method performed by a network node in relation to a base station swap.

FIG. 8 is a flowchart illustrating an embodiment of a method performed by a MS 135 in an example of a BS swap procedure. At 800, the MS 135 identifies a need to swap-out a first base station, BS1. The identifying of step 800 could for example include receiving a substitute request message 400 from BS1; receiving an indication of a low power level of BS1; identifying the expiry of a timer; estimating that a remaining power level of an airborne BS1 is below a certain threshold, etc. Estimation of the power level of a BS1 which depends on a local power source such as a battery could for example be based on previous statistics of power source discharge with respect to temperature, time of day, environment and operational parameters, sensor inputs, etc. An estimation of remaining power level could, if desired, be signaled to BS1. Such signaling could be periodic or event triggered based, e.g. the time granularity of reporting could be increased the shorter the time left of the estimated airtime, At 805, the MS 135 sends a swap indication to BS1 in a swap-out request message 405 to BS1. At this step, MS 135 typically also sends a swap indication to BS2 in a swap-in request message 410 to BS2. As mentioned above, the swap-in request message 405 and the swap-out request message 410 could for example comprise information on a swap-time $T_s$, BS authentication keys and other information relevant for the swap procedure.

At the optional step 810, the MS 135 supports BS1 and BS2 in verifying that BS2 is in the vicinity of BS1, for example by receiving position information from BS1 and convey the position information to BS2, and vice versa. However, in another embodiment, this presence verification can be performed by BS1 and BS2 in a stand-alone procedure, as discussed above.

In the optional step 815, the MS 135 sends one or more trigger messages to BS1 (and/or BS2, where applicable), cf. steps 705*a, b, c*. In some embodiments, MS 135 will, at 817, send an indication to relevant node(s) in the CN 110 to (temporarily) stop any UL transmission to WDs 125 currently served by BS1. In such embodiments, at the completion of the swap procedure by BS1 and BS2 at step 820, MS 135 advantageously sends, at 820, an indication to such node(s) of CN 110 to resume the UL transmission to WDs 125.

In the above, messages 400, 405, 410, 430, 435, 440, 445, 500, 505, 510 and the trigger messages have been described as stand-alone signaling messages. However, in another embodiment, one or all of these messages could be combined. The messages could be part of one or more new BS swap procedures (cf. FIG. 5), or be conveyed via already existing messages.

When wireless communication system 100 is a 4G system operating in accordance with the 3GPP 4G standard, the transferring of information between BS1 and BS2 is, in one embodiment, performed via the X2 interface. In one implementation in a 4G system, a BS swap procedure could for example be a new X2 Application Protocol (X2AP) procedure. In another implementation, an existing X2AP procedure is used: a BS state information message 430, a WD state information message 440, and/or a $T_s$ request 500 could for example be transmitted using the existing Handover Request message (with the corresponding Handover ACK message). Similarly, a swap-out request message 400 and/or a swap-in request message 410 could for example be transmitted using the existing X2 Setup message.

When wireless communication system 100 is a 5G system operating in accordance with the 3GPP 5G standard, the transferring of information between BS1 and BS2 could for example be performed via the X2 interface as described above, or via the Xn interface. In some implementations in a 5G system, a BS swap procedure could for example be a new Xn Application Protocol (XnAP) procedure. In other implementations, an existing XnAP protocol is used. A BS state information message 430, a WD state information message 440, and/or a $T_s$ request 500 could for example be transmitted using the state transfer message of X2 or Xn, and a swap-out request message 400 and/or a swap-in request message 410 could for example be transmitted using an existing message in the CN-RAN interface, e.g. an existing message in the NG-AP or S1-AP protocols.

Operating systems for OAM nodes typically vary between operators. The MS 135 could for example be included in an OAM node that is configured for HTTP communication. In such implementations of the MS 135, the swap-out request message 400, the swap-in request message 410 and other messaged between the MS 135 to a BS 105 could for example be a HTTP messages, such as Get and/or Post method messages.

Other communication interfaces than those described above between BS1 and BS2, as well as between a BS 105 and a MS 135, could alternatively be used.

Figure 9:
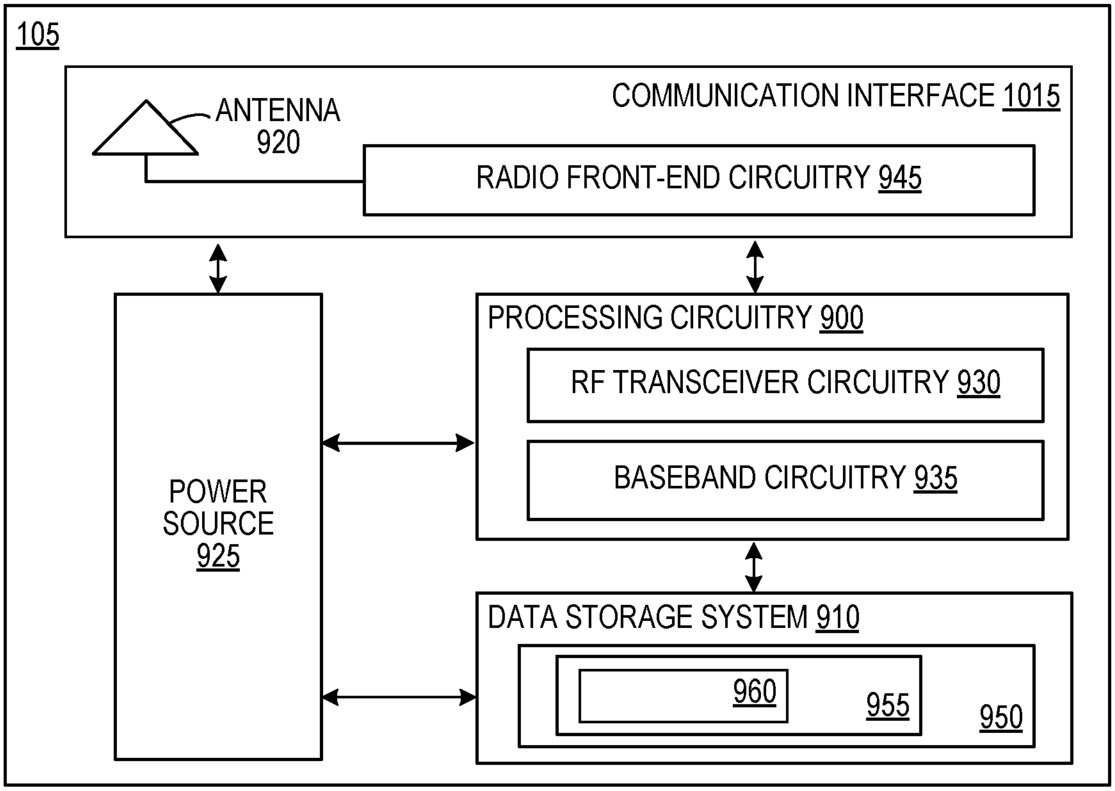
FIG. 9 illustrates a radio base station according to some embodiment.

FIG. 9 shows a BS 105 in accordance with some embodiments. As used herein, BS 105 refers to equipment capable, configured, arranged and/or operable to communicate directly or indirectly with a WD 125 and a MS 135 (and in many implementations also with other network nodes or equipment) in a wireless communication system 100. Examples of BSs 105 include, but are not limited to, Node Bs, evolved Node Bs (eNBs), NR nodeBs (gNBs), radio access points (APs), relay nodes, remote radio head (RRH), a node in a distributed antenna system (DAS), etc. Furthermore, examples of BSs 105 include movable BSs 105, which are mounted on a vehicle (e.g. on a UAV, a car/truck or a ship), or immobile BSs 105, which are installed in a more permanent installation.

The BS 105 of FIG. 9 includes processing circuitry 900, a local storage unit, here referred to as data storage system 910, a power source 925 and a communication interface 915 comprising an antenna 920.

In some embodiments, the BS 105 is configured to support more than one radio access technology (RAT), such as GSM, WCDMA, LTE, NR, WiFi, Zigbee, Z-wave, LoRaWAN, Radio Frequency Identification (RFID) and/or Bluetooth wireless technologies. In such embodiments, some components may be duplicated (e.g., separate data storage systems 910 for different RATs) and some components may be reused (e.g., a same antenna 920 may be shared by different RATs). The BS 105 may also include multiple sets of the various illustrated components for different wireless technologies integrated into BS 105. These wireless technologies may be integrated into the same or different chip or set of chips and other components within BS 105.

Data storage system 910 may include one or more non-volatile storage medium and/or one or more volatile storage medium. In embodiments where processing circuitry 900 includes a programmable processor, a computer program product 950 may be provided. Computer program product 950 includes a computer readable storage medium 955 storing a computer program 960 comprising computer readable instructions. In some embodiments, the computer readable instructions of computer program 960 are configured such that when executed by processing circuitry 900, the computer readable instructions cause the BS 105 to perform steps described herein (e.g., steps described herein with reference to FIGS. 3*a*, 3*b*, 4, 5, 6 and 7). In some embodiments, the computer readable medium 955 stores computer readable instructions which, when run on processing circuitry 900, cause the BS 105 to perform actions described in relation to first BS 105, BS1 and/or computer readable instructions which, when run on processing circuitry 900, cause the BS 105 to perform actions described in relation to second BS 105, BS2. In other embodiments, BS 105 may be configured to perform steps described herein without the need for code. That is, for example, processing circuitry 900 may consist merely of one or more ASICs. Hence, the features of the embodiments described herein may be implemented in hardware and/or software.

The data storage system 910 may store any suitable instructions, data, or information, including software, an application including one or more of logic, rules, code, tables, and/or other instructions/computer program code capable of being executed by the processing circuitry 900 and utilized by the BS 105. The data storage system 910 may further be used to store any calculations made by the processing circuitry 900 and/or any data received via the communication interface 915, such as data indicative of a swap-time $T_s$, data buffered for transmission in step 200 and/or step 210 and/or data received in step 220 and/or step 225. In some embodiments, the processing circuitry 900 and data storage system 910 are integrated.

The communication interface 915 is used in wired and/or wireless communication for signaling and/or transfer of user data between the BS 105 and entities of a CN 110, and/or WDs 125, and/or for communication with another BS 105. Communication interface 915 may include an interface adapted for direct communication with another BS 105, e.g. a Bluetooth interface). The communication interface 915 of FIG. 9 includes radio front-end circuitry 945 that may be coupled to, or in certain embodiments part of, the antenna 920. The radio front-end circuitry 945 may receive digital data that is to be sent out to other network nodes, WDs 125 of BSs 105 via a wireless connection, such as a wireless backhaul connection 115 or a radio interface 130. Similarly, when receiving data, the antenna 920 may collect radio signals, which are then converted into digital data by the radio front-end circuitry 945. Radio front-end circuitry 945 of FIG. 9 is connected to the antenna 920 and to processing circuitry 900. The radio front-end circuitry 945 may be configured to condition signals communicated between antenna 920 and processing circuitry 900.

In some alternative embodiments, BS 105 does not include separate radio front-end circuitry 945, instead, the processing circuitry 900 includes radio front-end circuitry and is connected to the antenna 920. In some embodiments, all or some of the RF transceiver circuitry 930 and/or base band circuitry 935 is part of the communication interface 915.

The antenna 920 may include one or more antennas, or antenna arrays, configured to send and/or receive wireless signals.

The power source 925 provides power to the various components of BS 105 in a form suitable for the respective components (e.g., at a voltage and current level needed for each respective component). The BS 105 may be connectable to an external power source (e.g., the power grid, an electricity outlet) via an input circuitry or interface such as an electrical cable, whereby the external power source supplies power to power circuitry of the power source 925. As a further example, the power source 925 may alternatively or additionally comprise a source of power in the form of a battery or battery pack.

Embodiments of the BS 105 may include additional components beyond those shown in FIG. 9 for providing certain aspects of the BS's functionality, including any of the functionality described herein and/or any functionality necessary to support the subject matter described herein. For example, in certain embodiments, communication interface 915 comprises port(s)/terminal(s) for sending and receiving data over a wired connection, for example to and from a CN 110. As a further example, the BS 105 may include user interface equipment to allow input of information into the BS 105 and to allow output of information from the BS 105. This may allow a user to perform diagnostic, maintenance, repair, and other administrative functions for the BS 105, for example providing a BS 105 with a swap-in request 405 or a swap-out request 410.

Figure 10:
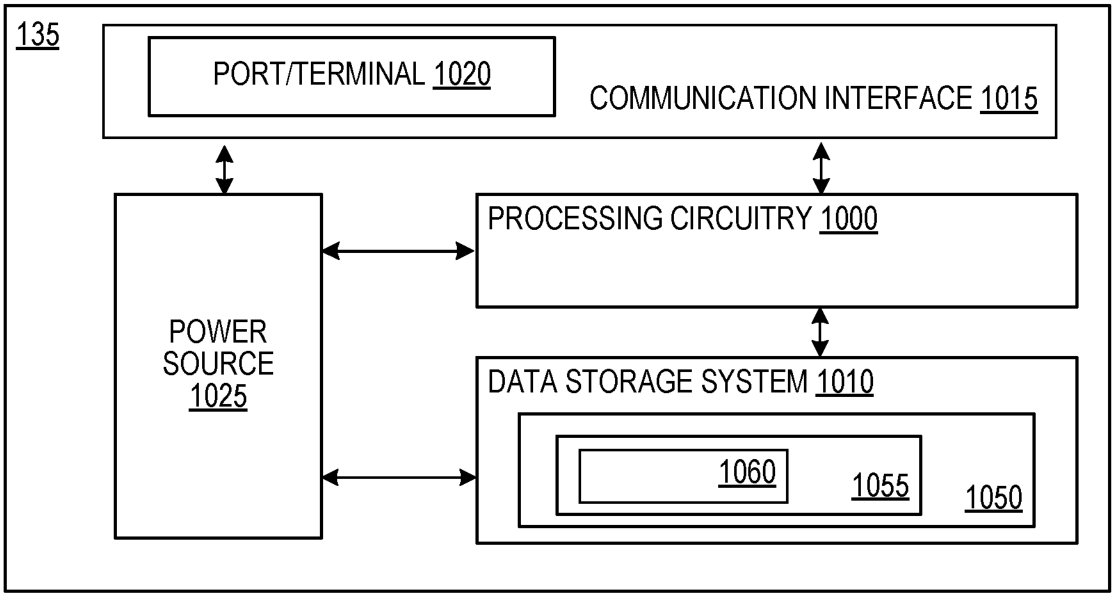
FIG. 10 illustrates a core network node according to some embodiment.

FIG. 10 is a schematic illustration of a network node 135, above referred to as a MS 135. As mentioned above, the MS 135 is, one embodiment, part of an OAM node in CN 110. Alternatively, the MS 135 could be a stand-alone node. In yet another embodiment, the MS 135 is part of another node in CN 110, such as for example an AMF or an MME. In one embodiment, MS 135 is a cloud implemented server and/or a distributed server. MS 135 may be implemented as part of a virtualization environment, in which functions of MS 135 are virtualized.

MS 135 of FIG. 10 comprises processing circuitry 1000, a communication interface 1015, a power source 1025 and a data storage system 1010. The communication interface 1015 is arranged to be used in wired and/or wireless communication of signaling and/or data between MS 135 and other entities in system 100, such as a BS 105 and/or other nodes in CN 110 or a radio access network of which the BS 105 forms a part. As illustrated, the communication interface 1015 comprises port(s)/terminal(s) 1020 to send and receive data, for example over a wired connection. Communication interface 135 could, in one embodiment, further include an antenna and radio front-end circuitry for wireless communication, for example for direct communication with a BS 105 over a wireless backhaul connection 115.

Data storage system 1010 may include one or more non-volatile storage medium and/or one or more volatile storage medium. In embodiments where processing circuitry 1000 includes a programmable processor, a computer program product 1050 may be provided. Computer program product 1050 includes a computer readable storage medium 1055 storing a computer program 1060 comprising computer readable instructions. In some embodiments, the computer readable instructions of computer program 1060 are configured such that when executed by processing circuitry 1000, the computer readable instructions cause the network node 135 to perform steps described herein (e.g., steps described herein with reference to FIGS. 4 and 8). In other embodiments, MS 135 may be configured to perform steps described herein without the need for code. That is, for example, processing circuitry 1000 may consist merely of one or more ASICs. Hence, the features of the embodiments described herein may be implemented in hardware and/or software.

The data storage system 1010 may store any suitable instructions, data, or information, including software, an application including one or more of logic, rules, code, tables, and/or other instructions/computer program code capable of being executed by the processing circuitry 1000 and utilized by the MS 135. The data storage system 1010 may further be used to store any calculations made by the processing circuitry 1000 and/or any data received via the communication interface 1015, such as data indicative of a swap-time $T_s$, data indicative of the power level of a battery of a BS 105, etc. In some embodiments, the processing circuitry 1000 and data storage system 1010 are integrated.

Computer readable medium 955 of BS 105, as well as computer readable medium 1055 of network node 135, may be a non-transitory computer readable medium, such as, magnetic media (e.g., a hard disk), optical media, memory devices (e.g., random access memory, flash memory), and the like.

The processing circuitry 900 of BS 105, as well as processing circuitry 1000 of network node 135, may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other components of BS 105 or network node 135, respectively, such as the data storage system 910/1010, in order to provide relevant functionality.

In some embodiments or BS 105 and/or network node 135, the processing circuitry includes a system on a chip (SOC). In some embodiments of BS 105, the processing circuitry 900 includes one or more of radio frequency (RF) transceiver circuitry 930 and baseband processing circuitry 935. In some embodiments of BS 105, the radio frequency (RF) transceiver circuitry 930 and the baseband processing circuitry 935 may be on separate chips (or sets of chips), boards, or units, such as radio units and digital units. In alternative embodiments, part or all of RF transceiver circuitry 930 and baseband processing circuitry 935 may be on the same chip or set of chips, boards, or units. This can also apply to network node 135 when such node comprises an antenna.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

List of Abbreviations

3GPP 3rd Generation Partnership Project'
AMF Access and Mobility management Function
AP Application Protocol
ARP Allocation Retention Priority
CGI Cell Global Identity
CN Core Network
DL Downlink
E-UTRAN Evolved Universal Terrestrial Access Network
eNB Evolved Node B, a base station for LTE
gNB Next generation Node B, a base station for 5G
GNSS Global Navigation Satellite Systems
GPS Global Positioning System
HTTP Hypertext Transfer Protocol
LTE Long Term Evolution
MAC Medium Access Control
MME Mobility Management Entity
NG-AP New Generation Application Protocol
NR New Radio
NSPS National Security Public Safety
OAM Operation, Administration and Maintenance
PCI Physical Cell Identity
PDCP Packet Data Convergence Protocol
RAN Radio Access Network
RLC Radio Link Control
TA Timing Advance
TMSI Temporary Mobile Subscriber Identity
UAV Unmanned Aerial Vehicle
UPF User Plane Function
UE User equipment
UL Uplink
UTRAN Universal Terrestrial Access Network
XnAP Xn Application Protocol
X2/Xn Communication interface between eNB/gNB

The invention claimed is:

1. A method of operating a first-radio base station (BS), which is to be replaced by a second BS, wherein the first BS and the second BS are moveable radio BSs and wherein the first BS provides radio access in a communication system to a plurality of wireless devices (WDs), the method comprising:

transferring, to the second BS, information indicative of a BS state associated with operation of the first BS;

reducing or discontinuing, prior to initiating the transferring of information indicative of the BS state, transmission data rate of data to/from a selection of WDs of the plurality of WDs to which the first BS has provided radio access;

obtaining, by negotiating with the second BS, an indication of a point in time when the second BS is to replace the first BS;

stopping transmission to/from the plurality of WDs to which the first BS is currently providing radio access; and transferring, to the second BS, information indicative of WD states associated with respective WDs of the plurality of WDs, wherein the transferring is performed based on the indication of the point in time when the second BS is to replace the first BS.

2. The method of claim 1, wherein the information indicative of WD states, associated with respective WDs of the plurality of WDs, comprises one or more of:

information on a transmission (Tx) state of a transmission protocol;

information on a reception (Rx) state of a transmission protocol;

user plane data for transmission to a WD and/or towards a core network (CN) of the communication system;

algorithms for flow control;

information on a buffer of a transmission protocol; and information on retransmission timers currently running.

3. The method of claim 1 further comprising:

determining an order between the plurality of WDs, in which order the information indicative of a WD state relating to different WDs will be transferred, wherein the determining is based on a respective priority indication of the plurality of WDs and/or on a priority indication relating to user plane data to be transmitted to/from the respective WDs.

4. The method of claim 1, wherein the selection of WDs is based on at least one of:

an Allocation/Retention Priority (ARP) value of a WD;

a Quality of Service (QoS) of a bearer on which a WD has transmitted and/or received data;

a value relating to an energy consumption of the first BS, the energy consumption being associated with a WD; and a speed of a WD in relation to the first BS.

5. The method of claim 1, further comprising:

obtaining an authentication key of the second BS; and verifying authenticity of the second BS by use of the authentication key.

6. The method of claim 1, wherein the BS state information indicative of a BS state comprises one or more of:

a WD context;

a security context;

an encryption key;

a transport network layer configuration;

a core network configuration;

a Temporary international Mobile Subscriber Identity (TMSI);

a signal strength report;

a quality report;

a Timing Advance (TA) value;

a New Generation (NG) context;

S1 context;

an E-UTRAN Cell Identity; and an E-UTRAN Cell Global Identity.

7. A method of operating a second radio base station (BS), which is to replace a first BS, wherein the first BS and the second BS are moveable radio BSs and wherein the second BS to provide radio access in a communication system to a plurality of wireless devices (WDs), the method comprising:

obtaining, by negotiating with the first BS, an indication of a point in time when the second BS is to replace the first BS;

receiving, from the first BS, BS state information indicative of a BS state associated with operation of the first BS, after the first BS has reduced or discontinued transmission data rate of data to/from a selection of WDs of the plurality of WDs to which the first BS has provided radio access;

configuring the second BS in accordance with the BS state information;

receiving, from the first BS, WD information indicative of WD states associated with a respective WDs to which the first BS has provided radio access; and providing radio access based on the obtained indication the point in time when the second BS is to replace the first BS to serve WDs previously served by the first BS.

8. The method of claim 7, wherein the providing of radio access to WDs is performed using a BS identity which was previously used by the first BS in providing radio access to WDs.

9. A first radio base station (BS) to provide radio access to a plurality of wireless devices (WDs) in a communication system, wherein the first BS is a moveable radio BS, the first BS comprising:

processing circuitry configured to:

transfer, to a second BS by which the first BS is to be replaced, BS state information indicative of a BS state associated with operation of the first BS, wherein the second BS is a moveable radio BS;

reduce or discontinue, prior to initiating the transfer of information indicative of a BS state, transmission data rate of data to/from a selection of WDs of the plurality of WDs to which the first BS has provided radio access;

obtain, by negotiation with the second BS, an indication of a point in time when the second BS is to replace the first BS;

stop transmission to/from the WDs to which the first BS is currently providing radio access; and transfer, to the second BS, WD state information indicative of WD states associated with respective WDs of the plurality of WDs, wherein the transfer is performed based on the indication of the point in time when the second BS is to replace the first BS.

10. The first BS of claim 9, wherein the processing circuitry is further configured to:

determine, based on a respective priority indication of a plurality of WDs and/or on a priority indication relating to user plane data to be transmitted to/from the respective WDs, an order between the plurality of WDs; and transfer the information indicative of a WD state in the determined order.

11. The first BS of claim 9, wherein stopping transmission of data to/from a WD comprises stopping uplink (UL) data transfers in relation to the WD, and wherein the processing circuitry is further configured to:

initiate transfer the BS state information at a first point in time ($T_1$);

initiate stopping of UL data transfers at a second, later, point in time ($T_2$) for at least a subset of the WDs; and initiate transfer of WD state information at a third, yet later, point in time ($T_3$) for the subset of the WDs.

12. The first BS of claim 9, wherein the processing circuitry is further configured to:

identify, in response to obtaining an indication indicative of an upcoming replacement, a WD, to which the first BS has provided radio access, as a candidate for reduced transmission; and reduce or discontinue transmission to/from the identified WD prior to initiate transfer of the BS state information.

13. The first BS of claim 9, wherein the processing circuitry is further configured to:

determine whether a replacement is required; and perform transfer of the BS state information, stopping of transmission, transferring of information indicative of a plurality of states, or any combination thereof, in response to a requirement of the replacement having been determined.

14. The first BS of claim 9, wherein the processing circuitry is further configured to:

transfer the BS state information and WD information indicative of a plurality of WD states to the second BS over a logically direct BS-to-BS communication interface, over an X2, or an Xn interface.

15. A second base station (BS) to provide radio access to wireless devices (WDs) in a communication system, wherein the second BS is a moveable radio BS, the second BS comprising:

processing circuitry configured to:

obtain, by negotiation with a first BS, an indication of a point in time when the second BS is to replace the first BS, wherein the first BS is a movable radio BS;

receive, from a first BS which the second BS is to replace, BS state information indicative of a BS state associated with operation of the first BS, after the first BS has reduced or discontinued transmission data rate of data to/from a selection of WDs of a plurality of WDs to which the first BS has provided radio access;

configure the second BS in accordance with the BS state information;

receive, from the first BS, information indicative of WD states associated with respective WDs to which the first BS has provided radio access; and provide radio access based on the obtained indication of the point in time when the second BS is to replace the first BS to serve WDs previously served by the first BS.

16. The second BS of claim 15, wherein the processing circuitry is further configured to:

receive, from a node in a core network in the communication system, information indicative of a geographical area where replacement is to take place; and ensure that the second BS is located in the geographical area.

17. The second BS of claim 15, wherein the processing circuitry is further configured to:

provide radio access to the WDs using a BS identity which was previously used by the first BS in providing radio access to the WDs.

18. The second BS of claim 15, wherein the processing circuitry is further configured to:

receive the BS state information and WD information indicative of a plurality of WD states from the first BS over a logically direct BS-to-BS communication interface, over an X2, or an Xn interface.

* * * * *